United States Patent Office 2,844,633
Patented July 22, 1958

2,844,633
PROCESS FOR PREPARATION OF FATTY ALCOHOLS

Frederic François Albert Braconier, Plainevaux, and Henri Le Bihan, Liege, Belgium, assignors to Societe Belge de l'Azote et des Produits Chimiques du Marly, Liege, Belgium No Drawing. Application July 3, 1956
Serial No. 595,596

Claims priority, application Great Britain July 20, 1955

6 Claims. (Cl. 260—638)

The present invention relates to processes for the preparation of fatty alcohols, and more particularly to processes for the preparation of higher fatty alcohols from the corresponding fatty acids.

The transformation of aliphatic carboxylic acids into the corresponding fatty alcohols by a direct hydrogenation or a catalytic reduction of the esters of these acids is known. The hydrogenation process is carried out with hydrogen at high pressure, while methanol, alone or together with water, is used in some catalytic reduction processes.

The direct hydrogenation process requires apparatus for producing hydrogen, for compressing the same, for recycling the excess hydrogen, and for preheating both fresh and re-cycled hydrogen. In view of the considerable size and complication of such apparatus, the capital expenditure and maintenance costs for carrying out the hydrogenation process are high, so that this process is of limited value for small plants having only small quantities of fatty acids to be transformed into the corresponding fatty alcohols.

According to the present invention, there is provided a process for the production of a higher fatty alcohol as hereinafter defined from the corresponding fatty acid, wherein the acid is caused to react with an excess of methanol in the presence of a catalyst under such conditions of temperature and pressure that both the water formed by the reaction between the acid and the methanol, and at least part of the excess methanol are decomposed to yield active hydrogen, whereby the fatty acid is reduced by the hydrogen thus produced to the corresponding fatty alcohol. By "higher fatty alcohol" is meant an alcohol having 6 to 24 aliphatic carbon atoms.

The hydrogenation catalyst comprises one or more metals or metallic compounds having a hydrogenating catalytic activity employed alone or in admixture with promoters. Copper, zinc, cadmium and iron and oxides thereof in combination with chromium or a chromium oxide as a promoter are preferably used. It is possible to operate at temperatures above 200° C., but the best results have been obtained at temperatures of between 325 and 375° C.

The reaction is desirably effected at high pressures of at least 300 atmospheres, e. g. 500 atmospheres, the optimum temperature and pressure being however dependent on the fatty acid which is employed.

The catalytic reduction process is an indirect hydrogenation process effected by the hydrogen produced in the decomposition of the excess methanol and of the water from the esterification reaction, the methanol being decomposed according to the equation:

$$CH_3OH \rightarrow CO + 2H_2 \qquad (I)$$

and the carbon monoxide yielded by the breakdown of the methanol decomposing the water according to the equation:

$$CO + H_2O \rightarrow CO_2 + H_2 \qquad (II)$$

The combination of the two equations (I and II) gives the following equation for the composite endothermic reaction:

$$CH_3OH + H_2O \rightarrow 3H_2 + CO_2 \qquad (III)$$

The esterification reaction between the fatty acids and methanol and the reduction of the ester group by the hydrogen produced in the decomposition Reactions I and II may be caused to take place in the same catalytic reactor over the same catalyst or catalysts so that the heat absorbed by the endothermic decomposition reactions prevents too great a rise in the temperature of the reactants due to the exothermic hydrogenation reaction.

Furthermore, the active atomic hydrogen produced by the decomposition reactions has a higher reactivity than the molecular hydrogen used in the direct hydrogenation processes, so that the transformation of the aliphatic carboxylic acids into their corresponding alcohols is easier and can be effected in a very much simpler apparatus.

The present invention is illustrated by the following example:

An intimate mixture of 6.3 kgs. per hour of fatty acids (from tallow melted at 40° C.) and of 3.7 kgs. per hour of methanol is caused to flow at a temperature of 350° C. and a pressure of 350 atmospheres through a catalytic tube containing an active carbon catalyst impregnated with salts of chromium and zinc, the catalyst being maintained at a temperature of 320 to 325° C. A product mixture of crude fatty alcohols (5.8 kgs.) and methanol (2.2 kgs.) and a gaseous mixture essentially comprising hydrogen, carbon dioxide, carbon monoxide and dimethyl ether were collected from the catalytic reaction tube.

The mixture of fatty alcohols which was separated by distillation from the other reaction products had the following characteristics:

Acidity index _____ 1.2
Saponification index _____ 1.5
Hydroxyl index _____ 204
Iodine index _____ 5.5

The recovered methanol was recycled for the treatment of a further quantity of fatty acids.

What we claim is:

1. A process for the production of a higher fatty alcohol from a corresponding fatty acid comprising reacting the acid with an excess of methanol to produce the methyl ester of said acid in the presence of a catalyst, while maintaining a temperature of 325 to 375° C. and a pressure of at least 300 atmospheres at which both the water formed by the reaction between the acid and the methanol, and at least part of the excess methanol, are decomposed to yield active hydrogen, whereby the said methyl ester is reduced by the hydrogen thus produced to the corresponding fatty alcohol.

2. A process as claimed in claim 1 comprising the use as catalyst of a metallic substance having a hydrogenating activity.

3. A process as claimed in claim 2 wherein the catalyst is selected from the group consisting of copper, zinc, cadmium, iron and oxides thereof as catalyst.

4. A process as claimed in claim 3 comprising the additional use of at least one catalytic promoter.

5. A process as claimed in claim 4 wherein the catalytic promoter is selected from the group consisting of chromium and chromium oxide.

6. A process as claimed in claim 1 wherein the process is effected at a pressure of 500 atmospheres.

References Cited in the file of this patent

UNITED STATES PATENTS 2,156,217    Andrews et al. _____ Apr. 25, 1939
2,322,097    Schmidt _____ June 15, 1943